Figure 3:
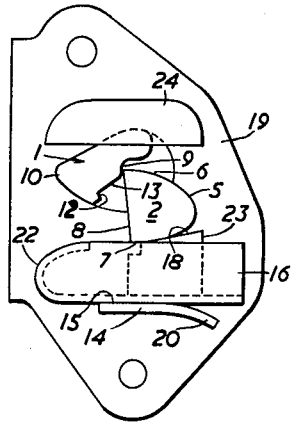

Jan. 15, 1963 V. CHANARYN ETAL 3,073,638
RELEASABLE FASTENING DEVICES
Filed Jan. 19, 1960 3 Sheets-Sheet 1

INVENTORS
VICTOR CHANARYN
PHILIP S. JEAVONS
PAUL R. PICKARD

BY
Irvin S. Thompson
ATTORNEY

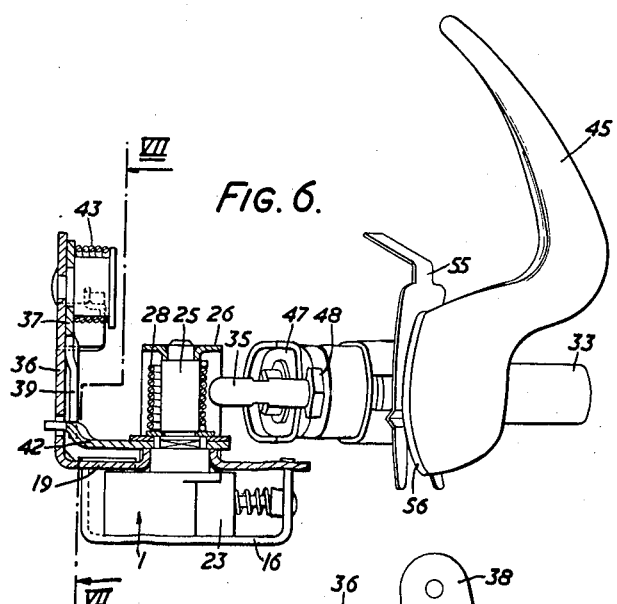
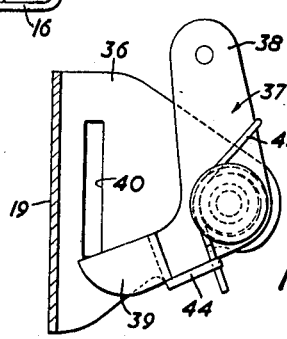
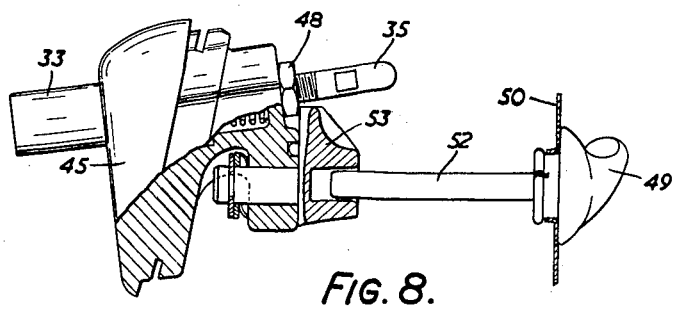

United States Patent Office 3,073,638
Patented Jan. 15, 1963

3,073,638
RELEASABLE FASTENING DEVICES
Victor Chanaryn, Solihull, Philip Swingewood Jeavons, Birmingham, and Paul Robert Pickard, Shirley, Solihull, England, assignors to Wilmot-Breeden Limited, Birmingham, England
Filed Jan. 19, 1960, Ser. No. 3,331
Claims priority, application Great Britain Jan. 20, 1959
5 Claims. (Cl. 292—226)

This invention relates to releasable fastening devices.

Releasable fastening devices have been developed, particularly for use on the doors of motor vehicles, which comprises two parts between which relative translatory and angular movements occurs during the fastening operation, so that when these parts are in a relative coupling or fastening position surface portions thereof coact so that said relative angular movement is irreversible by relative translatory movement between the parts in the reverse direction, due to the reaction force between the parts as a result of any tendency for such reverse relative translatory movement generating a condition of substantially no-moment about the axis of angular movement.

An example of such a fastening device in which one of the parts is in the form of a rotatably mounted cam and the other part is in the form of a keeper in which the cam is received during the fastening operation is described and illustrated in our co-pending application Serial No. 666,131 filed June 17, 1957, now Patent No. 3,002,369, granted October 3, 1961. The keeper is normally of complex form and may be of integral re-entrant shape, commonly of C shape or comprise two spaced parts separately mounted on a body pillar, and presents an inner face for coupling engagement with the cam and two side outer faces which are engaged to guide the cam relatively to the keeper during the fastening operation and are then wedged to provide vertical restraint when the door is closed.

The object of the invention is to provide a fastening device having a cam and keeper which coact in the aforesaid manner, wherein the keeper is of relatively simple construction and effects both fastening and vertical restraint of the device.

According to the invention a fastening device comprises a rotatably mounted cam and a keeper which undergo relative translatory movement during a fastening operation and as a result of which the cam turns into a relative coupling or fastening position in which a surface portion of the cam coacts with a rearwardly directed outer surface portion of the keeper in the aforesaid manner, and a member or members having two opposed surfaces fixed relatively to the axis of rotation of the cam which engage with corresponding surfaces on the keeper to guide the latter relatively to the cam during the fastening operaton and provide restraint, when the device is fastened, in a direction transverse to that of said relative translatory movement.

The direction of said relative translatory movement during the fastening operation is hereinafter termed "the fastening direction."

Preferably the keeper has a projection portion which presents in section, in a plane normal to the rotational axis of the cam, a closed figure of simple geometrical form the two side surfaces of which engage with said two opposed surfaces to provide the guiding and restraint and the rear surface of which enters into coupling engagement with the cam. Conveniently the two opposed surfaces are formed on separate members which project into the plan of the cam but which may be formed integrally with a backplate in which the cam is rotatably mounted. Alternatively, the keeper may have two portions formed integrally with a backplate or arranged to be separately mounted, one of these portions having the rearwardly directed coupling surface and both the portions respectively providing said corresponding surfaces which engage with the two opposed surfaces formed on the sides of a single member fixed relatively to the rotational axis of the cam.

The formation of the keeper and/or the member or members which move with the cam is preferably such that these parts engage smoothly in the event of misalignment of the parts in a direction transverse to the fastening direction, and thereafter provide guiding such that the cam and keeper are brought to their correct relative fastening position. A spring-loaded wedge may be mounted on one of the inter-engaging surfaces to engage with the corresponding surface and provide a wedging component of said restraint, the spring loading acting against the fastening direction.

The formation of the cam and the rearwardly directed surface of the keeper is preferably such that, as disclosed in our co-pending application Serial No. 847,307, now Patent No. 3,002,778, granted October 3, 1961, the reaction force between the cam and keeper, as a result of any tendency for reverse relative translatory movement of these parts, is substantially aligned with the fastening direction and produces substantially no torque about the rotational axis of the cam.

Figure 2:
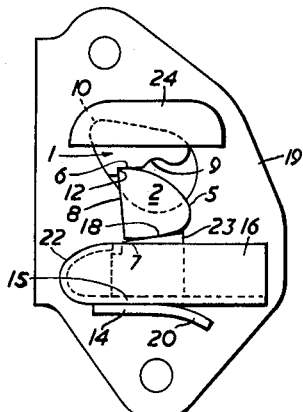
Figure 1:
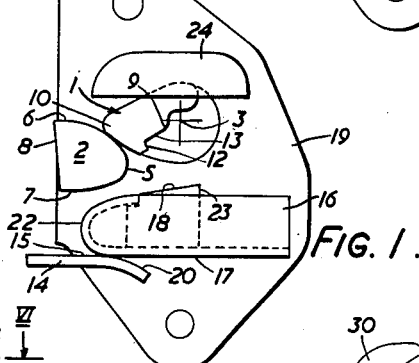
Figure 4:
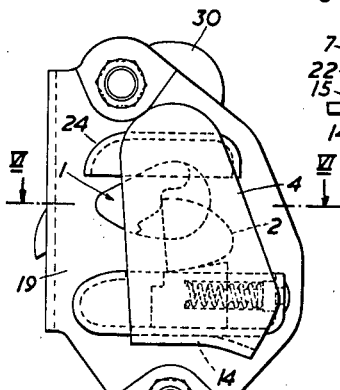
Figure 5:
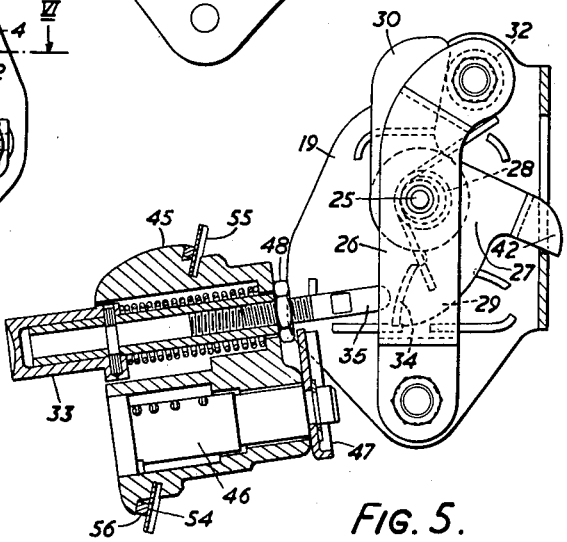

The invention will now be further described with reference to accompanying drawings which illustrate, by way of example, four motor vehicle door fastening devices in accordance with the invention and in which:

FIGURES 1 to 3 diagrammatically illustrate progressive stages by which a rotatably mounted cam of one of the devices engages with its keeper during a fastening operation, FIGURE 4 is a front view of the same device showing the cam and keeper in their relative fastening position, FIGURE 5 is a rear view of the device, with some of the internal elements removed to show the remainder with greater clarity, showing an external releasing pushbutton in cross-section.

Figure 9:
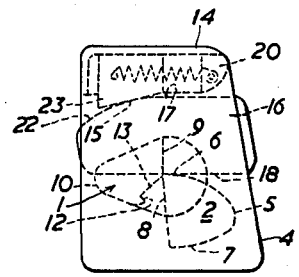
Figure 10:
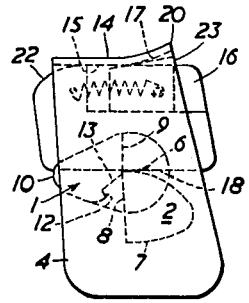
Figure 11:
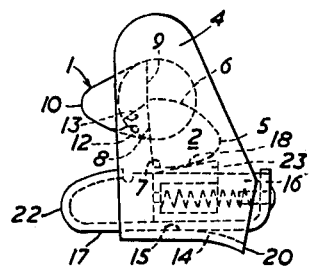

FIGURE 6 is a sectional view on the line VI—VI in FIGURE 4, showing the pushbutton not sectioned, FIGURE 7 is a sectional view on the line VII—VII in FIGURE 6, FIGURE 8 is a part-sectioned view showing an internal locking mechanism as used with the same device when applied to a rear vehicle door, FIGURES 9 to 11 are diagrammatic views, similar to FIGURE 3, illustrating the cams and keepers of the other three devices in their relative fastening positions.

All four fastening devices employ a formation of cam 1 and keeper, the latter having a projecting portion 2 for engagement with the cam 1, such that when these parts are in their relative fastening position they contact each other substantially at the rotational axis 3 of the cam and the reaction force between them, as a result of any tendency for relative translatory movement thereof in the opening direction, is substantially aligned with the fastening direction and produces substantially no torque about the axis 3. The devices further incorporate an internal releasing mechanism which operates, as described in detail hereinafter, to effect a positive turning movement of the cam during a releasing operation against the action of spring loading tending to turn the cam towards its fastening position.

In each of the devices the keeper comprises a backplate 4 (as shown in FIGURES 4 and 9 to 11) for mounting on a body pillar of the vehicle and from which the portion 2 projects. This keeper portion 2 in section presents a closed figure of simple geometrical form having a rounded forward or leading end 5 which merges into two short substantially parallel flat upper and lower side surfaces, 6 and 7 respectively. It also has a rear flat or slightly concave surface 8 which is disposed substantially normal to the fastening direction, and this surface 8 engages with a step 9 of the cam 1 when the latter is in its fastening position. As can be seen from the drawings, the cam 1 has a single lobe on which the step 9 is formed. The rear surface 8 of keeper portion 2 is slightly inclined, for example lying in a plane inclined to the plane normal to the fastening direction at an angle of approximately 1½°, and such inclination enables slight angular misalignment of the parts 1 and 2 to be tolerated before the reaction force resulting from any tendency for opening movement produces a torque on the cam 1 in the unfastening direction.

As described above the cam 1 has a single lobe; this lobe is offset from the rotational axis 3 and has a smooth rounded nose portion 10 for engagement with the rounded leading end 5 of the projecting keeper portion 2 during the fastening operation. This engagement rotates the cam 1 against its spring loading so that it rides over the adjacent side surface 6 of the keeper portion 2 until an intermediate step 12 on the adjacent side of the cam lobe has cleared the keeper portion 2, when the spring loading of the cam 1 turns the latter until the intermediate step 12 engages with the rear surface 8 of the keeper portion 2 to provide a condition of "safety lock." In FIGURE 2 the parts of the corresponding devices are shown in the safety lock condition.

As the fastening operation proceeds a smooth side face 13 of the cam lobe, disposed substantially normally to said intermediate step 12, rides along the surface 6 of the keeper portion 2 until the step 9, which is arranged at the end of the side surface portion 13 of the lobe clears the keeper portion 2. The cam is then further rotated by its spring loading to bring the rear step 9 into engagement behind the rear surface 8 of the keeper portion 2. The device is now fully fastened.

Both the intermediate step 12 and the rear step 9 are disposed forwardly of the rotational axis 3 of the cam, although the rear step 9 is only slightly offset therefrom, and they are so formed that in both the safety lock and the fully fastened position the reaction force as a result of any tendency for the door to open passes substantially through the axis 3. Ideally the rear step 9 would not be offset from the axis 3, and the cam 1 and keeper portion 2 would engage on this axis when fully fastened. However, in practice a small offset is necessary to allow for wear and manufacturing tolerances, and also to some extent to facilitate easy release and engagement of the parts.

A further portion 14 of the keeper projects from the backplate 4 thereof and provides a surface 15 which faces one of the side surfaces 6 and 7 of the keeper portion 2. In the devices of FIGURES 1 to 8 and FIGURE 11 the keeper portion 14 is disposed below the portion 2 so that the surface 15 faces the surface 7 of the portion 2; in the other two devices shown in FIGURES 9 and 10 it faces the upper surface 6 of the portion 2. A member 16 fixed relatively to the cam axis 3 so that it undergoes translatory movement therewith has opposed side surfaces 17 and 18 which respectively engage, during the fastening operation, the surface 15 and the adjacent surface of the portion 2. This engagement guides the cam and keeper into their correct relative fastening position, and the fixed member 16 is mounted on or formed integrally with a backplate 19 (as shown in FIGURES 1 to 7 in which it is formed integrally) in which the cam 1 is rotatably mounted.

The keeper portion 14 and the fixed member 16 have rounded nose sections, 20 and 22 respectively, which enable the parts to engage smoothly when slightly misaligned and the inter-engaging side surfaces of the two keeper portions 2 and 14 and the fixed member 16 are such that effective restraint in a direction transverse to the fastening direction is obtained when the device is fastened. One of these surfaces carries a spring-loaded wedge 23 which is moved against its spring loading during the fastening operation and introduces a wedging component into said restraint.

In the arrangements of FIGURES 1 to 8, 10 and 11 the keeper portion 14 is provided by a bent-up and forwardly curved edge portion of the backplate 4, with the wedge 23 mounted in the fixed member 16 and the outer face of this wedge providing either the surface 17 (as in FIGURE 10) or the surface 18 (as in FIGURES 1 to 3, and 11). In the other arrangement of FIGURE 9, the portion 14 is utilised as a mounting for the wedge 23 the lower face of which provides the surface 15. The member 16 in FIGURES 9 and 10 provides a partial shroud for the cam 1, and in the arrangement of FIGURES 1 to 8 a separate shroud 24 is fitted on to the backplate 19 for this purpose.

Referring specifically to FIGURES 1 to 8, the device illustrated therein has a cam spindle 25 which passes through and is rotatably mounted in the backplate 19 and has its inner end supported in a cranked outrigger bearing plate 26. Adjacent the inner surface of the backplate 19 a cam plate 27 is fixed on the spindle 25 in a plane parallel to the backplate 19.

A torsion spring 28, mounted around the spindle 25 with its ends respectively engaging a downwardly directed contactor arm 29 of the cam plate 27 and the bearing plate 26, provides the aforesaid spring loading for the cam 1 to urge the latter to its normal resting position as defined by abutment of an upwardly directed arm 30 of the cam plate 27 and a clinch nut 32 by which one end of the bearing plate 26 is mounted on the backplate.

The cam plate 27 forms part of said internal releasing mechanism which acts to apply a positive turning movements to the cam 1 in the releasing direction during the releasing operation, and is arranged to be operated optionally from outside the door by an external releasing member, such as a spring-loaded pushbutton 33 as shown in FIGURES 5, 6 and 8, or from inside the door through a remote control linkage. As shown in FIGURE 5 the contactor arm 29 is bent-up at its end to provide a contactor face 34, facing towards the outer door panel, for engagement by the pushbutton stem 35 during a releasing movement of the latter to turn the cam plate 27, and hence the cam 1, in the releasing direction against its spring loading. This acts to turn the cam 1 out of fastening engagement with the keeper portion 2, whereupon the door can be opened freely to separate the cam and keeper.

A portion 36 of the backplate 19 is bent-up at right angles to the remainder of the backplate 19 along the forward edge thereof, and a remote control lever 37 (see FIGURES 6 and 7) is pivotally mounted on the backplate portion 36. The lever 37 has an upwardly extending arm 38 formed for attachment to said remote control linkage (which is not illustrated) and an inwardly directed arm 39. An elongated slot 40 is formed in the backplate portion 36 and receives and guides the outer end of a third arm 42 of the cam plate 27 which passes above the arm 39 of the lever 37. A torsion spring 43 urges the lever 37 to its normal resting or inoperative position in which the arm 39 abuts a bent-up lug 44 at the lower edge of the backplate portion 36; in this position the arm 42 of the cam plate 27 in its normal resting position is just clear of the arm 39.

In the rear view of FIGURE 5 the lever 37 is not shown, and for clarity the backplate portion 36 is cut away forwardly of the slot 40.

The pushbutton 33 is mounted in the body of an outer door handle 45 which, in FIGURES 5 and 6, also incorporates a key-operated locking device 46 which acts to turn a locking lever 47 from an operative position to a locking position (shown in FIGURE 5) in which it blocks releasing movement of the pushbutton 33. The stem 35 is screwed into the pushbutton body for adjustment to its effective length during assembly, being locked in its adjusted position by means of a locknut 48. In its locked position the lever 47 is arranged in the path of the locknut 48 so that the device cannot be released from outside the vehicle door.

The arrangement just described is intended for use with the front vehicle doors, and for the rear doors the external key-operated means just described are omitted and replaced by internal locking means comprising a locking knob 49 (as shown in FIGURE 8) rotatably mounted on the inner door panel 50 and fixed on an outwardly extending locking shaft 52. The outer end of the shaft 52 engages in a locking lever 53 rotatably mounted in the outer door handle 45. As before the lever 53 can be turned, this time by means of the knob 49, from an inoperative position to a locking position (as shown in FIGURE 8) in which it is disposed in the path of the locknut 48 to block releasing movement of the pushbutton 33.

In both cases the outer door handle is mounted in an aperture in the outer door panel 54 (FIGURE 5) by means of a forked spring clip 55 which engages a groove in the handle. A resilient sealing washer 56 is fitted between the handle 45 and the outer face of the door panel 54.

The internal elements, and the external and internal releasing and locking means, of the arrangements of FIGURES 9 to 11 can be of generally similar form and function to those described in detail with reference to FIGURES 1 to 8 although they are not specifically illustrated in FIGURES 9 to 11.

We claim:

1. In a releasable fastening device, a cam rotatably mounted about an axis, a keeper adapted for coupling engagement with said cam, said cam having a rounded leading nose portion and first and second forwardly directed step portions spaced from said nose portion and from each other in the same surface, said keeper having a coupling portion comprising a rearwardly directed surface, and being of simple geometrical form including a rounded leading surface up which said nose portion of said cam rides during initial engagement therebetween to rotate said cam about said axis in the uncoupling direction prior to fastening engagement of said first step portion with said rearwardly directed surface, said first step portion being spaced at a greater distance from said axis than said second step portion and capable of engaging said rearwardly directed surface to form a safety lock condition, said second step portion being slightly offset from said axis and engaging said rearwardly directed surface substantially at said axis in a full lock condition whereby any reaction force exerted on said cam by said keeper, as a result of any tendency for the device to open, produces substantially no torque on said cam, said rearwardly directed surface being undercut to ensure a substantially line contact with said second step portion, a guide member mounted for translatory movement with said cam transversely of said axis thereof during a fastening operation, and a guide portion spaced from and interconnected with said keeper so that said guide member enters the space between and engages said keeper and said guide portion during said fastening operation to guide said cam and keeper into engagement and to provide relative restraint therefor when coupled in a direction transverse to the translatory movement.

2. In a releasable fastening device according to claim 1 in which manually operable releasing means operably engage said cam to turn same in a releasing direction away from the coupling engagement to release the fastening between the cam and keeper.

3. In a releasable fastening device according to claim 1, wherein a spring-loaded wedge is mounted on said guide member to engage with said keeper and provide a wedging component of said restraint, the spring loading acting against the fastening direction.

4. In a releasable fastening device according to claim 1, wherein the formation of said cam and said undercut surface is such that the reaction force between them, as a result of any tendency for the device to open, passes through said axis in a direction aligned with the direction of said translatory movement.

5. In a releasable fastening device according to claim 1, wherein spring means urge said cam to the coupling position in which said steps are disposed substantially at right angles to the fastening direction, whereby said reaction force is aligned with that direction.

References Cited in the file of this patent

UNITED STATES PATENTS

| | | |
|---|---|---|
| 2,259,670 | Van Voorhees | Oct. 21, 1941 |
| 2,679,420 | Crockett | May 25, 1954 |
| 2,811,383 | Tyrer et al. | Oct. 29, 1957 |
| 2,940,789 | Priestman | June 14, 1960 |
| 3,002,778 | Chanaryn et al. | Oct. 3, 1961 |

FOREIGN PATENTS

| | | |
|---|---|---|
| 679,556 | Great Britain | Sept. 17, 1952 |